United States Patent Office 3,085,858
Patented Apr. 16, 1963

3,085,858
RECOVERY OF MAGNESIUM COMPOUNDS FROM ORES
Philip W. Trubey, Hull, Quebec, and Ian B. Bruce, Aylmer, Quebec, Canada, assignors to Aluminium Laboratories Limited, Montreal, Quebec, Canada, a company of Canada
No Drawing. Filed Nov. 9, 1960, Ser. No. 68,152
Claims priority, application Great Britain Nov. 9, 1959
5 Claims. (Cl. 23—129)

The present invention relates to the extraction of magnesium, in the form of salts which may be calcined to produce magnesia. It is an object of the present invention to provide a process by means of which magnesium salts in a comparatively pure form may be recovered from minerals such as brucite or dolomite, which contain both calcium and magnesium.

It is already known that magnesium bisulphite can be extracted in relatively pure form from such minerals by leaching the mineral with sulphur dioxide in the presence of water. If the pH is controlled in such operation to a value between 4.5 and 5.5 there is little simultaneous dissolution of calcium as calcium bisulphite. It is, however, an object of the present invention to improve on the known process, both as regards to the degree of separation of the magnesium from calcium and as to the rate and completeness of the extraction of magnesium from the mineral.

It is found in accordance with the present invention that the simultaneous passage of carbon dioxide with sulphur dioxide in the leaching operation referred to above improves the rate of magnesium extraction from the mineral and at the same time has the effect of depressing the relative amount of calcium extracted. The result is a purer magnesium bisulphite solution than was obtained by the prior art process. Such solution may be used directly, for example, in a paper mill, or may be subjected to further processing.

It is found that calcium is dissolved in comparatively negligible quantities, i.e. under about 3% of the quantity of magnesium when the pH of the leaching solution is controlled to a value of 4.5–5.5 and this control of the pH value can readily be effected by control of the rate at which the reactants are brought together, i.e. the rate at which the ore is added to the leaching liquor. At pH values less than about 4.5, the solubility of calcium as calcium bisulphite rises fairly sharply and it is certainly preferred to carry out the process of the present invention at a pH value above 5.0.

The effectiveness of the use of carbon dioxide in conjunction with sulphur dioxide for sharpening the separation of magnesium from calcium is shown by the following example.

In water saturated with sulphur dioxide and carbon dioxide at room temperature and at pH 4.5, magnesium (as MgO) has a solubility of 14.5 gms. per litre and calcium (as CaO) has a solubility of only 0.32 gm. per litre, thus giving a MgO:CaO ratio of 45:1. In water saturated with sulphur dioxide gas alone, it is found that the solubility of calcium (as CaO) increases to 2.32 gms. per litre, giving a MgO:CaO ratio of only 6.25:1.

In addition to increasing the efficiency of the separation of magnesium from calcium in the sulphur dioxide leaching process, the use of carbon dioxide very materially increases the speed and efficiency of the leaching operation. In one test finely ground brucite ore was added to a solution, maintained in a saturated condition by gassing with both sulphur dioxide and carbon dioxide, at pH 5.0 over a period of 15 minutes and in this time 92.5% of the magnesium in the ore was leached out. The pH value was maintained at plus or minus 0.25 of the stated value by control of the rate of addition of the powdered brucite ore.

Under identical conditions, using sulphur dioxide alone, it took 25 minutes to add the same quantity of finely ground ore without departing from the stated pH value and an extraction of only 55.5% of the magnesium was obtained.

The rate at which the ore can be added is dependent on the fineness of the grinding and the actual characteristics of the mineral, which vary from sample to sample, depending upon origin.

By the method above described a purer solution of magnesium bisulphite may be obtained than was possible using sulphur dioxide alone, and such magnesium bisulphite solution may be produced more rapidly.

According to a further development of the invention magnesium sulphite is recovered in the solid state by treating the magnesium bisulphite solution thus produced with magnesium oxide or magnesium hydroxide in excess of the stoichiometric quantity required to convert the magnesium bisulphite in the solution to magnesium sulphite.

Magnesium oxide or hydroxide is added in sufficient quantity to raise the pH of the liquor to about 9.0 and to achieve this about 10% in excess of the stoichiometric quantity is required. The addition of magnesium oxide to magnesium bisulphite solution leads to the precipitation of magnesium sulphite hexahydrate. With the addition of the stoichiometric quantity of magnesium oxide or hydroxide, only about 60% of the magnesium is precipitated in the form of the sulphite from a magnesium bisulphite solution of initial pH 4.5. The addition of 10% excess magnesium oxide beyond the stoichiometric quantity raises the precipitation of the magnesium sulphite hexahydrate to about 80%. The excess magnesium oxide or hydroxide is recovered with the magnesium sulphite in the filter cake.

Magnesia may be obtained from the precipitated magnesium sulphite hexahydrate by calcination which simultaneously regenerates the sulphur dioxide. The sulphur dioxide evolved in the calcination is preferably recycled for the treatment of fresh ore, whilst a little more than half of the magnesium oxide (magnesia) thus produced is retained for addition to further quantities of magnesium bisulphite solution.

We claim:

1. A process for the extraction of magnesium from a mineral containing magnesium and calcium which comprises leaching the magnesium therefrom by treating said mineral with a saturated aqueous solution of sulphur dioxide and carbon dioxide whilst maintaining the pH value of said solution within the range of 4.5 to 5.5 to produce a solution of magnesium bisulphite which contains calcium, in dissolved compound form, in less amount, measured as CaO, than about 3% of the magnesium measured as MgO.

2. A process for the extraction of magnesium as claimed in claim 1, which comprises adding finely ground mineral to a solution of sulphur dioxide and carbon dioxide, maintained in a saturated condition by passage of a stream of both gasses therethrough, the mineral being added at such rate that the pH value of the solution is maintained at about 5.0.

3. A process for the extraction of magnesium as claimed in claim 1, further comprising adding a substance selected from the group consisting of magnesium hydroxide and magnesium oxide to said solution of magnesium bisulphite in a quantity in excess of the stoichiometric quantity required to convert the magnesium bisulphite of said solution to magnesium sulphite and collecting the resultant precipitate containing magnesium sulphite hexahydrate.

4. A process for the extraction of magnesium as claimed in claim 3, wherein the substance selected from the group consisting of magnesium hydroxide and magnesium oxide is added in such quantity as to raise the pH value of the solution to about 9.0.

5. A process for the extraction of magnesium as claimed in claim 3, further comprising calcining the collected precipitate to convert substantially the whole of the magnesium content to magnesium oxide.

References Cited in the file of this patent

UNITED STATES PATENTS

| | | |
|---|---|---|
| 2,572,929 | Hazelquist | Oct. 30, 1951 |
| 2,644,748 | Cunningham | July 7, 1953 |

FOREIGN PATENTS

| | | |
|---|---|---|
| 485,284 | France | Dec. 27, 1917 |